June 26, 1934.  C. H. KRAUSE  1,964,290
ROTARY CUTTING TOOL APPLIANCE
Filed Sept. 29, 1933
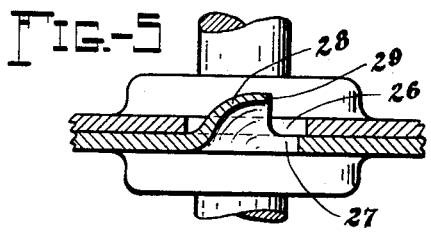
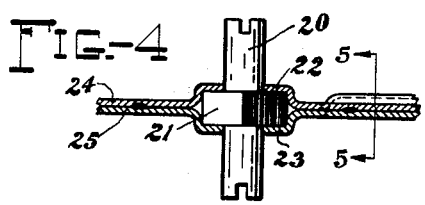
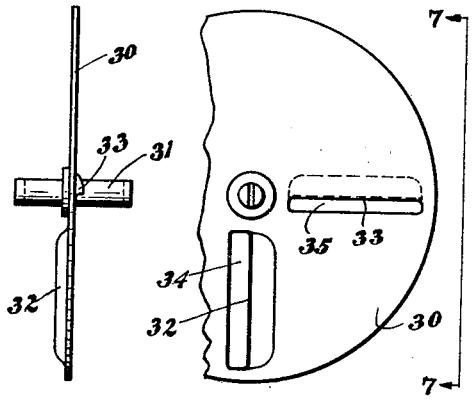
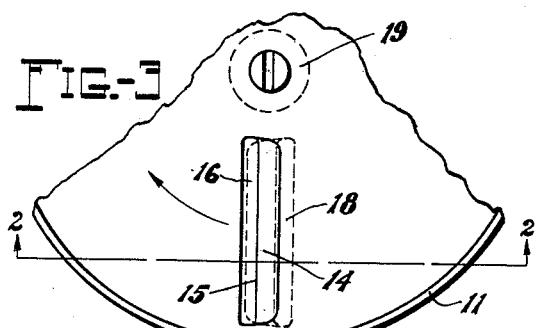
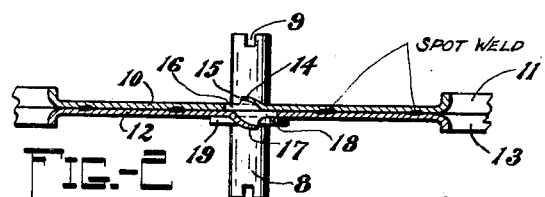
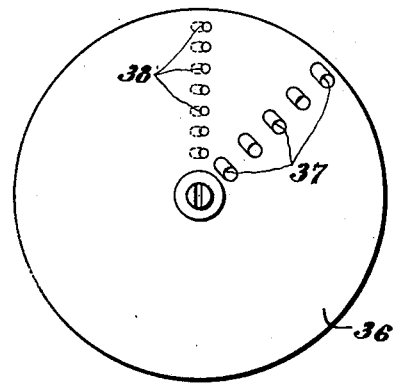
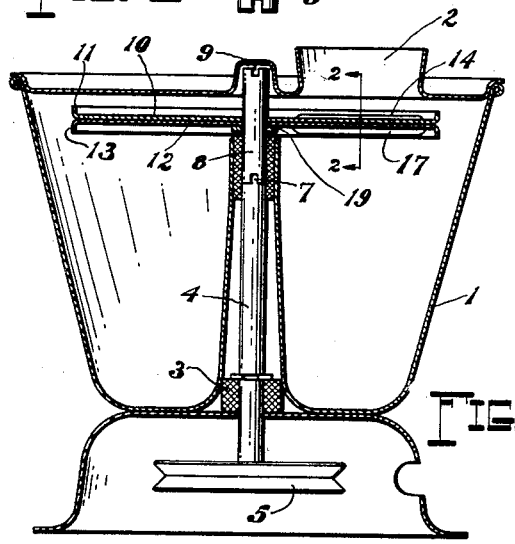
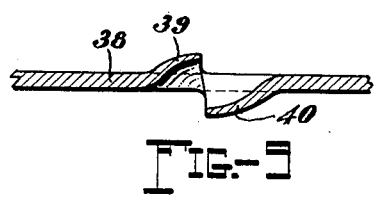
INVENTOR
CECILE H. KRAUSE
BY
ATTORNEY Patented June 26, 1934

1,964,290

UNITED STATES PATENT OFFICE 1,964,290

ROTARY CUTTING TOOL APPLIANCE

Cecile H. Krause, Cleveland, Ohio

Application September 29, 1933, Serial No. 691,463

9 Claims. (Cl. 146—124)

My invention pertains to a cutting tool appliance and more particularly to mechanism as a kitchen labor-saving device adapted to slice, shred, or grate foodstuffs.

During the past few years such household appliances for preparing foods have earned a growing popularity and several have employed a series of cutting discs adapted to cut slices of varying thickness or to shred or to grate, but involving the necessity of four or more discs for alternative use with multiplied cost for their near duplication, needless increase of the parts to be stored, and excess frequency of replacement of one by another.

I am aware that the cutting tool art is highly developed and that rotary cutting discs carrying radial or segmental knives have long been known and used. So far as my knowledge extends, no one has hitherto conceived the employment, in domestic appliances of the character stated, of knives or sharpened projections on both sides of cutting discs while also making the carrying shafts for the latter reversibly connectible and consequently lessening the number required to be bought and kept ready for use. Accordingly, the objects of my invention are to simplify and to economize and such objects are realized by fixedly mounting a duplex and reversible cutting disc on a short shaft which is itself invertibly attachable by having both of its extremities adapted for tongue and groove connection with the free extremity of a driving shaft so as to rotate in unison therewith. The drawing illustrates a series of modifications of the reversible feature and certain optional manufacturing variations subject to personal preference or commercial expediency.

Figure 1 is a vertical section, as a bare outline of a receptacle in which is shown mounted a driving shaft on which is detachably and reversibly mounted a short shaft which carries a cutter disc after the manner of my invention.

Figure 2 is an enlarged view of the cutter disc assembly shown in Figure 1.

Figure 3 is a broken top plan view of Figure 2.

Figure 4 is a broken view corresponding to Figure 2 showing a modification of the central portion and of the knife formation.

Figure 5 is a still further enlarged sectional view of one side of Figure 4.

Figure 6 is a plan view of a simplified form of cutter disc.

Figure 7 is an edge elevational view of Figure 6.

Figure 8 is a plan view of a combined shredding and grating disc on which the shredding projections extend from one side and the grating projections from the opposite side.

Figure 9 is a broken view corresponding to Figure 2 showing a further modification of the central structure.

A receptacle 1 has a lateral opening 2 in its cover for the pressure insertion, say, of a vegetable to be sliced and is centrally provided with a vertical bearing 3 in which is suitably mounted a shaft 4 carrying on its lower end a pulley 5 to be feasibly connected with a source of power. As may be observed in Figure 1 the upper end of the shaft is depressed below the top of the bearing and has its upper extremity fashioned as a quadrilateral stud 7.

Adapted for detachable driving connection with the upper end of the shaft 4 is a cutter shaft 8 each end of which is fashioned with a channel 9 adapted rotatably to interlock with the stud 7. Fixedly and concentrically secured in any appropriate manner to the cutter shaft 8 is a disc 10 having an upwardly flanged reinforcing periphery 11 and likewise secured to the shaft 8 in side to side abutting relationship with the disc 10 is a similar disc 12 having a downwardly flange periphery 13. The two discs are spot welded together at a plurality of points as indicated in Figure 2.

The upper disc 10 is fashioned with a struck-out and upwardly projecting tongue 14 which as exemplifiedly appears in Figure 3, extends radially, but which may obviously be disposed in any segmental direction. Such tongues are displaced laterally after appropriate slitting of the disc, and if the thickness of the disc metal requires, the cutting edge 15 may be sharpened. In order to insure unobstructed passage of an edible slice through the disc 10 the aperture adjacent to its tongue or knife is preferably extended forwardly of the cutting edge 15, with reference to the direction of rotation, as indicated by the numeral 16. The disc 12 is similarly fashioned with an inversely formed or downwardly projecting tongue 17 and opposite to the tongue 14 is fashioned with an enlargement 18 of the aperture caused by the downward displacement of the tongue 17.

It is to be understood that while the knife 14 functions to cut, the knife 17 will be inutile. The knife 14 will cut a slice of a thickness determined by the distance that its cutting edge 15 is spaced from the near side of the disc assembly. It is to be observed that the cutting edge of the tongue 17 is located a greater distance from, while also substantially parallel to, the lower side of the 10—12 disc assembly so that when the latter is inverted slices of correspondingly greater thickness may be obtained. In order to maintain the cutting edge of the knife which is in use at a predetermined constant elevation a washer 19 is provided, which encircles the shaft 8 and is in contact with the disc 12, and such washer is to have a thickness equal to the difference between the distances that the cutting edges of the knives 14 and 17 are located from their respective sides of the disc assembly.

Cutting discs of the general type described have heretofore had a thickness of about one-sixteenth of an inch ($\frac{1}{16}''$) in order to be rigid enough to resist the pressure applied by the edible being cut, and such thickness unavoidably required sharpening of the leading edges of the prongs in order to have them function as knives. My employment of two discs spot welded together is to permit reduction in thickness of each to about one thirty-second of an inch ($\frac{1}{32}''$), which is calculated to be thin enough to avoid the necessity of an additional sharpening procedure.

Figures 4 and 5 pertain to a double modification. A shaft 20 has its middle 21 polygonal shaped and crimp-enclosed or otherwise confined by enveloping central areas 22 and 23 of two discs 24 and 25 which latter are consequently secured to the shaft 20 against both axial and relative turning movement. The upper and lower discs are fashioned with a circumferentially spaced pair of registering slots 26 and 27 respectively and each disc is fashioned with an integral tongue 28 struck out through the adjacent slot in the other disc and which tongues terminate as cutting edges 29.

Figures 6 and 7 reveal the principles of my invention applied to a single cutting disc 30 which is centrally attached to a stub shaft 31. The disc 30 is integrally fashioned with a pair of struck-out knives 32 and 33 which project in opposite axial directions whereby slots 34 and 35 are provided in line with said knives respectively. Merely by way of exemplification, the two knives 32 and 33 are struck out along radial lines at an angle of 90 degrees with respect to each other, but it is added that they are preferably not diametrically disposed so as not to weaken the disc along such a line. Observation of Figure 7 will show the knife 32 to be more displaced so as to have its extremity or cutting edge removed a greater distance from its side of the disc than the distance that the cutting edge of the knife 33 is removed from its side of the disc. The slots 34 and 35 are preferably made somewhat broader than the width of the knife which originally occupied a part of the planes of such slots in order to facilitate the passage of sliced material therethrough.

Figure 8 is a plan view of a combined shredding and grating disc 36 from one side of which arcuate shredding tongues 37 project and from the other side of which in relatively staggered relation somewhat smaller arcuate grating tongues 38 project. The tongues 37 and 38 which project in opposite directions axially from the disc 36 are shown arranged in rows and their structure, except for size and shape, approximate the form of struckout tongue shown in Figure 5.

Figure 9 is a very close equivalent though simplified modification of the central disc structure shown in Figure 2. A single stub-shaft-supported disc 38 has a plurality of radially extending sets of knives, each set being composed of a pair of tongues 39 and 40 struck out in opposite directions closely adjacent to a dividing radial plane and one of each pair of a set a greater distance than the other.

I claim:—

1. A cutting tool comprising a pair of discs secured to each other side to side, each disc being provided with an aperture and a knife, the knife on each disc being opposite to and projecting through the aperture of the other disc.

2. A cutting tool of the character described, comprising the combination of a pair of thin discs secured to each other side to side in abutting relationship, said discs being fashioned each with a peripheral flange, said flanges projecting in opposite directions respectively, and each disc being also provided with a knife projecting in the same direction as its flange and further provided with a slot, the knife on one disc being opposite the slot in the other.

3. A rotary cutting tool, comprising the combination of a pair of circular discs secured to each other side to side in abutting relationship, each disc being integrally fashioned with a radially extending knife and provided with a radially extending slot circumferentially removed with respect to its knife and axis-surrounding protrusions on said shaft and on each disc, said protrusions being interfitted to compel rotation in unison.

4. In combination, a shaft, a pair of discs secured to each other side to side in abutting relationship and mounted on said shaft, each disc being provided with a knife and further provided with a slot, the knife on one disc being opposite the slot in the other and means comprising polygonal axis-surrounding protrusions on each disc and on said shaft for preventing axial displacement of said disc assembly along, and for compelling rotational movement of said disc assembly in unison with, said shaft.

5. In combination, a receptacle provided with a bearing, a shaft mounted in said bearing, a reversible shaft having both of its ends adapted for detachable connection with one end of said first mentioned shaft, means for turning the latter and a reversible cutter secured to said reversible shaft and provided with knives projecting in opposite axial directions.

6. In an appliance of the character described, the combination of a bearing support, a shaft mounted in said bearing, means for turning said shaft, and a reversible cutting tool adapted for connection with said shaft and comprising; a disc fashioned with a pair of struck-out and sharpened tongues, said tongues projecting in opposite axial directions and a tongue on one side farther than a tongue on the opposite side of said disc, said disc furthermore provided with an aperture in line with each tongue and means including an element extending through said disc and having its extremities adapted for rotatable interlock with said shaft and also including spacer projections for abutment with the end of said bearing support, said projections being on opposite axial sides of said tool and each extending from its side a distance substantially equal to the distance of projection of a tongue on the same side.

7. A cutting tool of the character described, comprising the combination of a pair of thin discs secured to each other side to side in abutting relationship, each disc being provided with a knife and with a slot, the knife on each disc projecting through the slot in the other disc.

8. The combination for coaction with a drive shaft, of a reversible shaft having both of its ends adapted for detachable connection with one end of the drive shaft and a circular cutting disc centrally attached to said reversible shaft and provided with knives projecting in opposite axial directions.

9. In an appliance of the character described, the combination of a bearing support, a shaft mounted in said bearing, means for turning said shaft, and a reversible cutting tool adapted for connection with said shaft and comprising; a disc provided with a pair of knives, said knives projecting in opposite axial directions and a knife on one side projecting farther than a knife on the opposite side of said disc, said disc being also fashioned with an aperture in line with each knife and means including an element extending through said disc and having extremities each adapted for rotatable interlock with said shaft.

CECILE H. KRAUSE.